United States Patent [19]
Peck

[11] Patent Number: 5,205,525
[45] Date of Patent: Apr. 27, 1993

[54] CUP HOLDER FOR VEHICLES

[75] Inventor: Schuyler B. Peck, Bothell, Wash.

[73] Assignee: Piccar Inc., Bellevue, Wash.

[21] Appl. No.: 893,799

[22] Filed: Jun. 4, 1992

[51] Int. Cl.$^5$ .............................................. A47K 1/08
[52] U.S. Cl. ............................ 248/311.2; 224/42.45 R
[58] Field of Search ................. 248/314, 311.2, 313, 248/310; 224/42.45 R, 42.42, 273; 220/476, 482; 297/194; 211/77, 78, 74

[56]  References Cited

U.S. PATENT DOCUMENTS

| | | | |
|---|---|---|---|
| 1,386,108 | 8/1921 | Harding . | |
| 2,281,849 | 5/1942 | McCoppin | 211/77 |
| 2,801,066 | 7/1957 | Clare | 248/311 |
| 2,837,305 | 6/1958 | Andren | 248/148 |
| 2,913,207 | 11/1959 | Eash | 248/148 |
| 2,982,982 | 5/1961 | Swift, Sr. | 15/257.06 |
| 3,194,403 | 7/1965 | Van Horn, Jr. | 211/78 |
| 3,428,281 | 2/1969 | Karp | 248/146 |
| 3,662,979 | 5/1972 | Lucci | 248/154 |
| 4,015,810 | 4/1977 | Williams | 248/311.1 |
| 4,056,361 | 11/1977 | Peters et al. | 23/259 |
| 4,303,218 | 12/1981 | Naegeli | 248/146 |
| 4,474,354 | 10/1984 | Field | 248/596 |
| 4,482,522 | 11/1984 | Baudisch et al. | 422/104 |
| 4,724,986 | 2/1988 | Kahn | 224/273 X |
| 4,728,018 | 3/1988 | Parker | 224/273 |
| 4,775,055 | 10/1988 | Morse | 211/78 |
| 4,798,360 | 1/1989 | Alter | 248/311.2 |
| 4,821,216 | 1/1988 | Kinder | 215/100.5 |
| 4,828,211 | 5/1989 | McConnell et al. | 248/311.2 |
| 4,943,111 | 7/1990 | Laan | 297/194 |
| 5,022,626 | 6/1991 | Nozel | 248/311.2 |
| 5,071,002 | 12/1991 | Bradley | 211/77 X |

FOREIGN PATENT DOCUMENTS 658713   3/1963   Canada .............................. 211/78

Primary Examiner—J. Franklin Foss
Attorney, Agent, or Firm—Seed and Berry

[57]  ABSTRACT

A holder for drinking containers includes a template that is rotatably secured to a support shaft. A base plate is also secured to the support shaft. The template includes first, second, and third sides each including a respective first, second, and third hole. The first, second, and third holes are of differing sizes so that the template may be rotated to position a side, and respective hole, opposite the base plate for accommodating a drinking container of a desired diameter. The base plate is movably secured to the shaft so that the relative height of the template with respect to the base plate may be adjusted to further accommodate drinking containers of varying sizes.

10 Claims, 2 Drawing Sheets

CUP HOLDER FOR VEHICLES

TECHNICAL FIELD

The present invention is directed toward a holder for supporting and positioning drinking containers at the occupant's location in a vehicle and, more particularly, is directed toward a holder for positioning drinking containers wherein the holder can be easily adjusted to accommodate drinking containers of various sizes.

BACKGROUND OF THE INVENTION

The operators and passengers of vehicles, particularly long-distance truck drivers, often desire to drink liquids, contained in drinking containers, while driving or riding. Further, the operators and passengers of vehicles desire to rest the drinking containers at times when they are not drinking therefrom. However, due to the motion imparted to the vehicle while in use, it is not possible, without any special holder, to securely rest a drinking container in a vehicle. Without a special holder, the drinking container is likely to tip over and spill while the vehicle is in motion.

Several devices have been proposed for supporting and positioning drinking containers in vehicles in a manner to prevent the drinking container from tipping over and spilling while the vehicle is in motion. As an example, devices have been proposed for supporting and positioning drinking containers wherein the devices include a receptacle for receiving the bottom of the drinking container. These devices are typically constructed to be supported by the vehicle, such as, for example, intermediate the passenger and driver.

However, these devices typically include a single receptacle for receiving a drinking container having a bottom of a predetermined diameter. When drinking containers having a bottom of a diameter either larger or smaller than the receptacle are used by the operator or passenger of the vehicle, then the drinking container is still likely to tip and spill while the vehicle is in motion. Further, although some of these devices have more than one receptacle, they usually have only one size for the receptacles. Accordingly, even devices having more than one receptacle are unable to accommodate drinking containers that have bottoms of a different diameter than that of the receptacles.

Still further, many prior art devices for supporting and positioning drinking containers in a vehicle only provide receptacles for receiving the bottom of the drinking container. Using these devices, the drinking container is capable of tipping and spilling even when the receptacle is sized to fit the diameter of the drinking container. This is because when the drinking container is full, the center of gravity is raised above the top of the receptacle far enough so that the drinking container is easily tipped.

Accordingly, it is desirable to provide a holder that is capable of being used with drinking containers having varying diameters. Further, it is desirable to provide a holder for drinking containers wherein the holder prevents the container from spilling even when the container is full. Still further, it is desirable to provide a holder for drinking containers wherein the holder is capable of being used with drinking containers of varying diameters and is capable of supporting the drinking containers even when the containers are full.

SUMMARY OF THE INVENTION

In a first embodiment of the present invention, a holder for positioning drinking containers in a vehicle includes a template having first, second, and third sides fixed at substantially right angles wherein the first, second and third sides include respective first, second, and third holes each sized to receive drinking containers of differing perimeters. The holder also includes a shaft for supporting the template wherein the shaft includes apparatus for securing the shaft to the vehicle. A coupler is provided for rotatably coupling the template to the shaft. Also, the holder includes a base slidably coupled to the shaft for supporting the bottom of the drinking container. The base is movably coupled to the shaft so that the height of the base may be adjusted with respect to the template.

In another embodiment of the invention, the holder includes a support member, having first and second ends, constructed to engage the vehicle. Additional support structure is coupled to the support member for receiving the bottom of the drinking container. The holder also includes a positioning assembly coupled to the support member for receiving the top of the drinking container. The support member and the positioning assembly cooperate to support and position the drinking container to prevent the container from tipping while the vehicle is in motion.

DETAILED DESCRIPTION OF THE INVENTION

Figure 1:
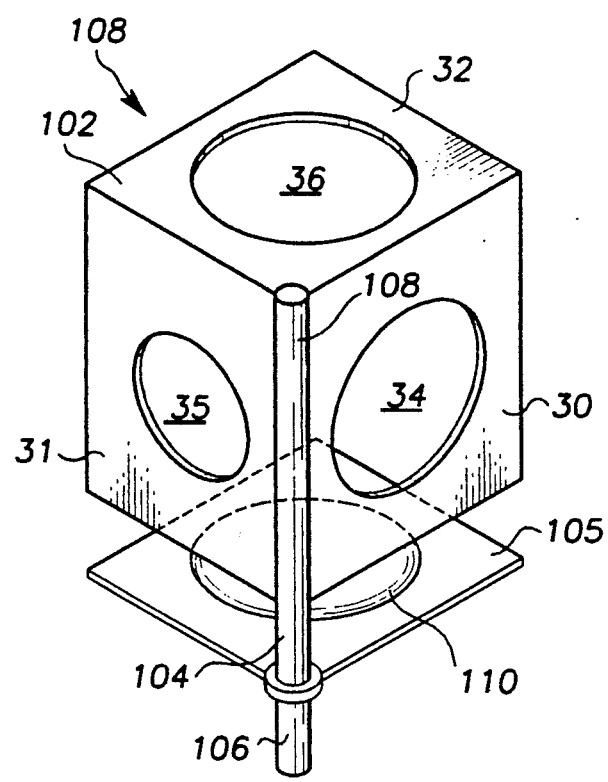
FIG. 1 is an illustration of the holder that is the subject of the present invention.

A holder 100 is illustrated in FIG. 1. The holder 100 includes a template 102 that is coupled to a support shaft 104. A base plate 105 is also coupled to the support shaft 104. The support shaft 104 is coupled to the vehicle by any means known in the art. More particularly, the support shaft 104 may be permanently fixed to the vehicle or may be removably mounted to the vehicle. Still further, the support shaft 104 may be mounted to a base, or other fixed structure constructed to be supported by the vehicle, for supporting the holder 100 in an upright position. Those skilled in the art will readily appreciate that a variety of ways exist for supporting the holder 100, each of which falls within the scope of the present invention.

As illustrated in FIG. 1, the support shaft 104 is an elongate, substantially cylindrical shaft having first and second ends 106 and 108. The first end 108 includes a protruding portion 401 (FIG. 4) positioned at a substantially right angle to the second end 106 of the shaft 104. It will be appreciated by those skilled in the art, however, that the support shaft 104 may comprise any of a variety of structures, having a variety of shapes and configurations, for supporting the template 102 and the base plate 105.

Figure 2:
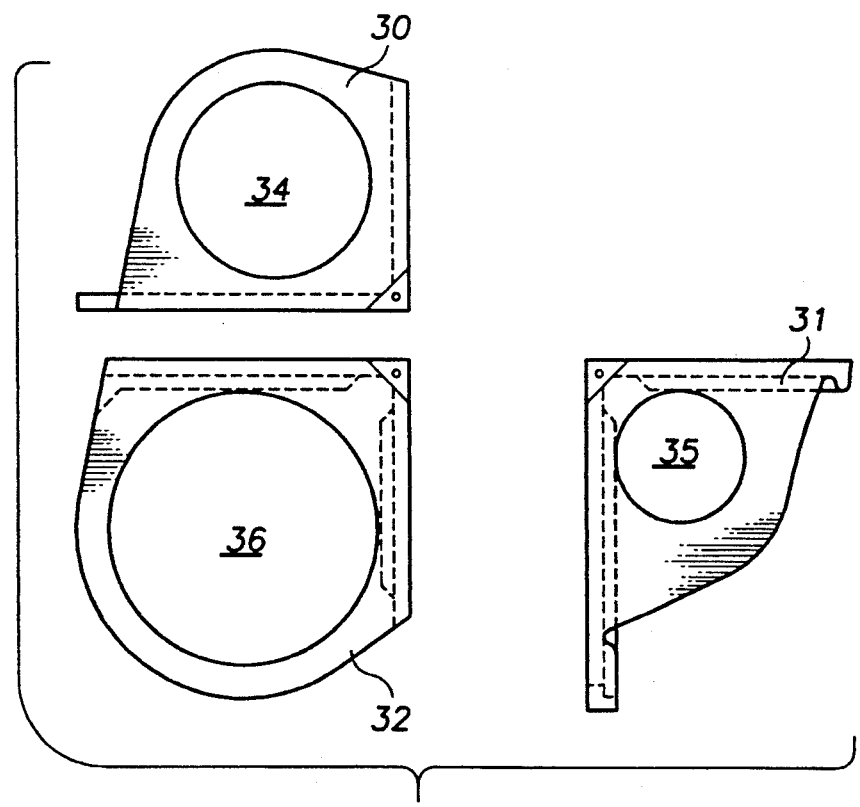
FIG. 2 is an illustration showing a portion of the holder of the subject invention separated into its component parts for the purposes of this description.

The template 102 includes first, second, and third sides 30, 31, and 32, respectively. Each side includes a respective hole 34, 35, and 36. In accordance with the present invention, each hole 34, 35, and 36 is constructed to receive a drinking container of varying perimeter. More particularly, as illustrated in FIG. 2, each hole 34, 35, and 36 is constructed to receive a drinking container having a differing size diameter. It will be apparent to those skilled in the art, however, that although the invention is described herein by reference to holes having differing diameters, holes may be provided wherein the perimeters vary in ways other than the diameter. As an example, holes of differing shape may be provided for the holes 34, 35, and 36.

Figure 4:
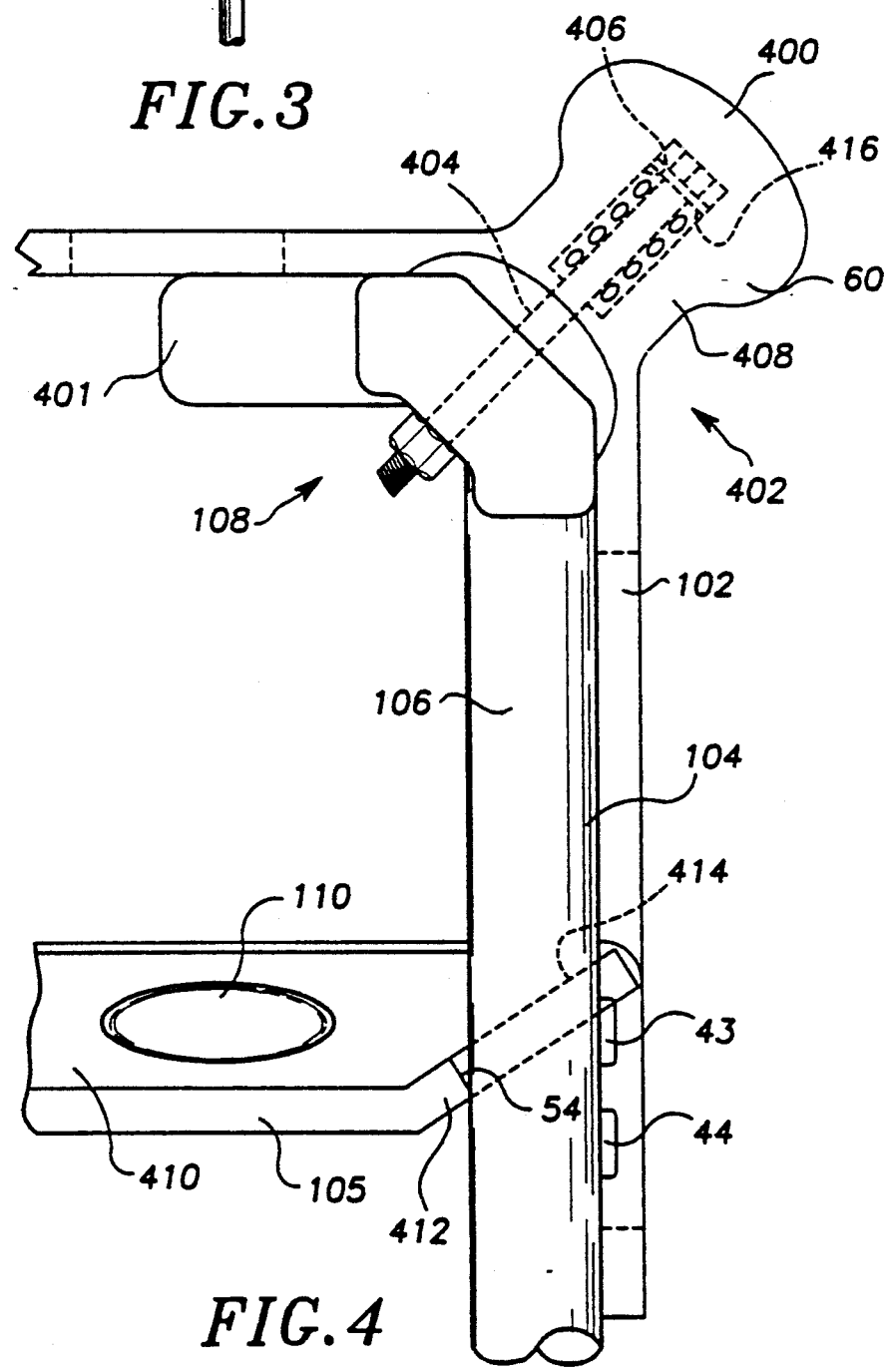
FIG. 4 is a partial view of the holder illustrated in FIG. 1.

With reference to FIG. 4, the template 102 preferably includes apparatus for permitting a user of the holder 100 to grip the template. As illustrated in FIG. 4, the template 102 includes a knob 400 for providing the gripping structure. Other gripping structure for permitting the user to grip the template 102 may be readily substituted for the knob 400 without departing from the true scope and spirit of the present invention.

A coupling assembly 402 is provided for rotatably coupling the template 102 to the shaft 104. The coupling assembly 402 permits the template 102 to be rotated so that any one of the sides 30, 31, or 32 may be placed substantially parallel to the base plate 105. The coupling assembly 402 includes a coupling member 404 that is secured to the shaft 104 intermediate the protruding portion 401 and the second end 106. The coupling member extends through the shaft and into a retaining chamber 406 of the knob 400. A biasing spring 408 is positioned in the retaining chamber 406 and abuts a lip 416 of the coupling member 404 to bias the template 102 to the shaft 104. It will be apparent to those skilled in the art that although the coupling assembly 402 is described herein by reference to the coupling member 404 and biasing spring 408, other structure could be provided for rotatably coupling the template 102 to the shaft 104.

Returning to FIG. 1, the sides 30, 31, and 32 are coupled together at right angles to one another. In use, a drinking container is inserted through the hole of one of the sides of the template 102 until the bottom of the drinking container rests on the base 105. By positioning the sides of the template at right angles to one another, three sides may be provided so that the drinking container may be inserted through one side without interference from any other side. Alternative angling of the sides will permit more sides, and holes of varying perimeters, to be used without interference from other sides. When the user wishes to use a side having a hole of an alternative perimeter, the user rotates the template 102 until the hole of the desired perimeter is in position opposite the base plate 105. In this manner, the holder 100 may be provided with a variety of holes for accommodating drinking containers of varying perimeters.

The base plate 105 includes a well 110 positioned on a first side thereof. The well 110 is a substantially shallow well having sloped sidewalls for receiving the bottom of the drinking container. The sloped sidewalls of the well 110 enable the base plate 105 to receive and support drinking container of varying diameters. The well 110 of the base plate 105 and the holes 34, 35, and 36 of the template 102 cooperate to provide support to the drinking container to prevent the drinking container from tipping and spilling even when it is full. It will be appreciated by those skilled in the art that since the drinking container is supported by both the base plate 105 and the template 102, that the well 110 need not be sized to mate exactly with the bottom of the drinking container for the drinking container to be properly supported. However, it is desirable for the well to be at least larger than the bottom of the drinking container so that the bottom of the drinking container is prevented from slipping over the base plate 105. It will be apparent to those skilled in the art that other structure for preventing the bottom from slipping over the base plate may readily be substituted for the well 110. As an example, the surface of the base plate 105 may be roughened to increase the friction between the bottom of the drinking container and the base plate.

Figure 3:
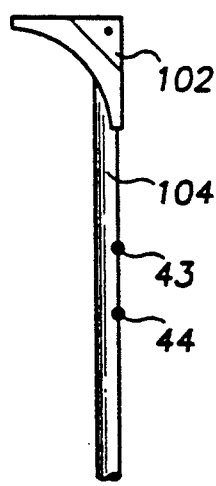
FIG. 3 is an illustration of the support member of the subject invention.

The base plate 105 is preferably movably secured to the shaft 104 to permit the height of the base plate to be adjusted with respect to the template 102. As illustrated in FIG. 3, first and second screws 43 and 44 are secured to the shaft 104. The base plate 105 includes a first substantially planar portion 410 (FIG. 4) and a second substantially planar portion 412 that are angled with respect to one another. The second planar portion 412 includes a through-hole 414 sized so that the shaft 104 can be positioned in the through-hole 414. The through-hole 414 is further sized so that when the second planar portion is positioned substantially perpendicular to the shaft 104, the screws 43 and 44 are enabled to pass through the through-hole and so that when the second planar portion is positioned at an angle to the shaft 104 substantially less than a right angle, the screws 43 and 44 cannot pass through the through-hole 414 and the base plate 105 is supported on the shaft 104 by the screws 43 or 44.

As described above, the base plate 105 may be positioned along the shaft 104 by angling the base plate and moving the base plate to a location along the shaft 104 proximate a screw 43 or 44. In this manner, the height of the template 102 relative to the base plate 105 may be adjusted. Adjusting the height of the base plate 105 relative to the template 102 permits the holder to accommodate drinking containers of varying heights, thereby further enabling the holder 100 to accommodate drinking containers of varying sizes and shapes. Although the adjustment of the height of the template 102 relative to the base plate 105 has been described herein by reference to the second planar portion 412, through-hole 414, and first and second screws 43 and 44, it will be apparent to those skilled in the art that a variety of ways for adjusting the height of the base plate 105 relative to the template 102 may be provided without departing from the scope of the present invention.

It will be apparent to those skilled in the art that although the invention has been described herein by reference to a few preferred embodiments thereof, modifications and variations thereof are possible without departing from the true scope and spirit of the invention. It is the intent of the inventor(s) that the appended claims encompass all such modifications and variations of the invention.

We claim:

1. A holder for supporting drinking containers in the cab compartment of a vehicle comprising:
   a shaft having first and second ends, said first end of said shaft being secured to said vehicle, a protruding portion being fixed to said second end of said shaft and angled thereto;
   first and second screws secured to said shaft;
   a base plate having first and second substantially planar portions wherein said first planar portion is angled with respect to said second planar portion, said first planar portion having first and second sides with a substantially circular and shallow well formed in said first side, said well having sloped sidewalls and being sized to receive the bottom portion of the drinking container, said second planar portion having a through-hole for receiving said shaft so that said base plate may be supported upon said shaft, said through-hole having an edge defining the size of said through-hole, said through-hole being sized so that when said second planar portion is positioned at a substantially right angle with respect to said shaft, said through-hole can be moved over said screws, said through-hole being further sized so that when said second planar portion is positioned at an angle substantially smaller than a right angle with respect to said shaft, said edge abuts said first and second screws to support said base plate upon said shaft;

a template having a first, second, and third sides, said first, second, and third sides including respective first, second and third holes sized to receive drinking containers of differing diameters, said first, second, and third sides being joined at right angles with respect to one another to form a corner, said template having a knob secured to said corner; and a coupling member coupled at one end to said first end of said shaft and coupled at the other end to said template, said coupling member including a spring positioned for biasing said template toward said shaft to secure said template in position with respect to said shaft.

2. A holder for supporting drinking containers in the cab compartment of a vehicle comprising:

template means having first and second sides, said first and second sides including respective first and second holes sized to receive drinking containers of differing perimeters;

a shaft for supporting said template means; and coupling means for rotatably securing said template means to said shaft.

3. The holder as recited in claim 2, further comprising base means for supporting the drinking container, said base means being coupled to said shaft.

4. The holder as recited in claim 3, further comprising adjustable coupling means for coupling said base means to said shaft so that the height of said base means can be changed with respect to said template means.

5. The holder as recited in claim 3 wherein said base means further comprises means for receiving and positioning the bottom of the drinking container.

6. The holder as recited in claim 3 wherein said base means further comprises first and second sides with a substantially circular and shallow well formed in said first side.

7. The holder as recited in claim 2 wherein said template means further includes a third side, said third side being fixed to said first and second sides at respective right angles, said first, second, and third sides including respective first, second, and third holes sized to receive drinking containers of differing diameters.

8. The holder as recited in claim 2 wherein said template means further comprises gripping means for gripping said template to rotate said template with respect to said shaft.

9. The holder as recited in claim 2 wherein said coupling means further comprises means for biasing said template means to said shaft.

10. A holder for positioning drinking containers in a vehicle, said holder comprising:

template means having first, second, and third sides fixed at substantially right angles wherein said first, second, and third sides include respective first, second, and third holes each sized to receive drinking containers of differing perimeters;

a shaft for supporting said template means, said shaft including means for supporting said shaft in the vehicle;

coupling means for rotatably coupling said template means to said shaft; and base means for supporting the bottom of the drinking container, said base means being movably coupled to said shaft so that the height of said base means may be adjusted with respect to said template means.

* * * * *

UNITED STATES PATENT AND TRADEMARK OFFICE
CERTIFICATE OF CORRECTION

PATENT NO. : 5,205,525
DATED : April 27, 1993
INVENTOR(S) : Schuyler B. Peck

It is certified that error appears in the above-identified patent and that said Letters Patent is hereby corrected as shown below:

On the title page, after "Assignee:", please delete "Piccar Inc" and substitute therefor --PACCAR Inc--.

Signed and Sealed this

First Day of March, 1994

Attest:

BRUCE LEHMAN

Attesting Officer

Commissioner of Patents and Trademarks